United States Patent [19]

Shuster

[11] 3,643,095
[45] Feb. 15, 1972

[54] AUTOMATIC COLLIMATOR CONTROL FOR X-RAY APPARATUS

[72] Inventor: Ronald F. Shuster, Euclid, Ohio
[73] Assignee: Picker Corporation, White Plains, N.Y.
[22] Filed: Nov. 28, 1969
[21] Appl. No.: 880,620

[52] U.S. Cl. .............................. 250/105, 250/65 R, 250/66
[51] Int. Cl. ........................................................... G21f 5/04
[58] Field of Search .................................... 250/65, 66, 105

[56] References Cited

UNITED STATES PATENTS

| 2,921,202 | 1/1960 | Berger et al. | 250/105 |
| 3,130,313 | 4/1964 | Tilling | 250/105 |
| 3,502,878 | 3/1970 | Stewart et al. | 250/105 |
| 3,518,435 | 6/1970 | Kok | 250/105 |

Primary Examiner—Archie R. Borchelt
Attorney—Watts, Hoffmann, Fisher & Heinke

[57] ABSTRACT

In X-ray apparatus, shutter opening dimensions are controlled automatically in accordance with the distance of an X-ray tube from a film and the size of film being used. Shutter opening is controlled automatically in accordance with film size only when the X-ray tube is oriented in particular directions, and is spaced from the film within a predetermined range of distances.

Actual shutter opening is compared with computed, desired shutter opening and the actual shutter opening adjusted to correspond to the desired opening. The circuitry is digital in nature, as opposed to analog, and energizes shutter drive motors to operate at fixed speed to adjust the shutters properly, at which time the motors are completely deenergized.

Means are provided for manually adjusting the shutter opening when it is desired not to operate automatically, or when the X-ray tube is oriented in other than predetermined directions, or when the X-ray tube is spaced from the film by a distance outside the predetermined range.

35 Claims, 9 Drawing Figures

INVENTOR.
RONALD F. SHUSTER
BY Watts, Hoffmann,
Fisher & Heinke.
ATTORNEYS.

AUTOMATIC COLLIMATOR CONTROL FOR X-RAY APPARATUS

CROSS-REFERENCE TO RELATED PATENTS AND APPLICATION

U.S. Pat. No. 3,511,955, issued May 12, 1970, to D. F. Lombardo, entitled "Automatic Shutter Control."

U.S. Pat. No. 3,502,872, issued Mar. 24, 1970, to E. A. Norgren, entitled "Automatic Shutter Control."

US. Pat. No. Re. 24,982, issued May 9, 1961, to R. C. Schiring et al., entitled "Tubular Telescopic Column."

U.S. Pat. No. 2,968,732, issued Jan. 17, 1961 to A. J. Foderaro, entitled "Tube Stand Head Counterbalance."

U.S. application for Letters Pat. Ser. No. 656,448 filed July 27, 1967 by E. A. Norgren, entitled "X-ray Apparatus Including Counterbalancing Mechanism for Spot Filmer or the Like."

BACKGROUND OF THE INVENTION

1. Field of the Invention

This invention relates to X-ray apparatus, and, more particularly to automatically operated shutters for use in such apparatus to provide a proper image field size as the size of X-ray film is varied and as the distance between the shutters and the image plane is varied.

2. Description of the Prior Art

In known types of X-ray and fluoroscopic apparatus, radiation from an X-ray tube passes through a quadrangular opening whose two dimensions are defined by opposed edges of a pair of movable shutters. The radiation then passes through a portion of the body of the patient under examination, in the case of a medical application, and impinges on X-ray sensitive film or on a fluorescent viewing screen. Since the amount of energy required for an X-ray exposure varies with the distance from the film according to the inverse square law, it is desirable to minimize the X-ray tube to film distance. Accordingly, while the distance between the shutters and the X-ray tube is generally constant, the distance between the shutters and the X-ray sensitive film or screen is usually variable, to minimize this tube to film distance. In conducting a variety of studies, it is desirable to use films of various sizes, in which case it is desirable to have the size of the image at the image plane (the plane of the film) equal to the size of the film being used. To accomplish this, shutter openings are adjusted according to the size of a selected film. It is also apparent that the distance between the image or film plane and the X-ray tube will require variations in the shutter opening in order to maintain a constant image size as that distance is varied. In other words, if the X-ray source is close to the film, the shutters must be opened to a greater extent than if the X-ray tube is farther from the film, in order to maintain the same image size at the film.

Heretofore, these required variations in shutter openings have normally been accomplished manually by physically adjusting the shutters. In the case of X-ray radiography as opposed to fluoroscopy, it has been exceedingly difficult, if not impossible, to adjust the shutter opening to the proper size, because of the lack of a visible image on the image or film plane. Therefore, it has often been necessary to perform X-ray radiography with the shutters in an over-open or even full-open position. This is undesirable in many cases because it exposes a greater portion of the patient's body to potentially dangerous X-ray radiation than is necessary to produce the required size of image. In addition, it may expose the operator to the direct X-ray beam if the field size is larger than a shielded portion of a spot filmer or the like.

In medical X-ray radiographic work, some studies are conducted with an X-ray tube positioned below the table surface and others with the tube above. In the below-the-table arrangements, the X-ray tube and an imaging device, such as a spot filmer, are typically mounted on a common column. When the imaging device is manipulated to position it relative to a patient, the tube and film are automatically maintained in alignment. Automatic shutter control systems have been developed for such below-the-table applications. One such system is that disclosed and described in the above-referenced U.S. Pat. No. 3,511,955 to Daniel F. Lombardo and the application and patent of Edward A. Norgren. Those devices are directed primarily to a below-the-table tube application where only one film size is employed. Thus, the automatic control need only compensate for the selected exposure size and X-ray tube to film distance.

There have been other proposals for X-ray beam size adjustment including proposals for detecting the size of a selected film cassette and adjusting the shutters according to the cassette and therefore the film size. None of these prior proposals, however, have dealt with the complex problems represented in attempting to provide automatic shutter control in an above-the-table X-ray tube.

With an over-the-table X-ray tube in modern equipment the tube is typically mounted from a movable carriage on the ceiling. The tube must be brought into alignment with a film mounted in the table as in a so-called bucky tray. Since the tube and the film are not physically connected in a manner which will assure alignment, a problem not present in the under-the-table automatic shutters, is confronted. In addition, the over-the-table tube is angularly adjustable with respect to the film and its spacing relative to the film plane is often adjustable over a far greater range than a spot filmer relative to an under-the-table tube. Further, the over-the-table X-ray tube normally has multiple uses for various purposes. For example, in a typical installation, the tube may be used with films of a variety of sizes for chest studies or the like without an X-ray table or with a table when the table is in either a horizontal or a vertical position.

In present day X-ray equipment, it is known to provide a source of visible light adjacent the X-ray tube so that the shutter size may be adjusted by observing the image field size of the source of light. While this is operable, it entails an additional procedural step for the equipment operator who is already overburdened with other operating procedure.

Accordingly, it is a general object of the present invention to provide a shutter control that automatically adjusts the shutter opening to provide images of various image field sizes controlled in accordance with the particular size of film being utilized, that automatically varies the shutter opening as required when the X-ray tube is moved toward and away from the subject or object under examination to maintain a chosen image field size.

SUMMARY OF THE INVENTION

With the present invention when the X-ray tube is used with a horizontal table, the image size is adjusted automatically for the size of film being used and the shutter opening automatically controlled only when the X-ray source is transversely located with respect to a film cassette mounted within the table. In addition, there is provision for automatically adjusting the shutter opening to provide a predetermined image size when the examination table surface is vertically positioned and the X-ray source was located a predetermined distance from the film, and also when the cassette is mounted at a predetermined location such as on a wall of the examination room.

In accordance with the present invention, two servo channels are provided for independently controlling the length and width of the shutter opening. In each channel, two variable voltages are provided, which are respectively proportional to a desired image field size dimension and to the distance of the image plane from the X-ray tube. The desired image field size dimension is controlled by the size of the film being used in the apparatus. These two voltages are provided to analog circuitry which produces a shutter reference voltage proportional to the proper shutter opening in a corresponding dimension.

The shutter reference voltage is supplied, along with a voltage that is proportional to the actual shutter opening in a corresponding dimension, to digital comparison circuitry. If the two voltages applied to it are different, the digital circuitry provides an output voltage that causes one or the other of two motor driver circuits to supply current to the armature of a reversible direct current (DC) motor that mechanically opens and closes the shutter. Which of the motor driver circuits is energized determines the polarity of the current supplied to the motor. Thus the motor may be driven in either direction. If the two inputs to the digital circuitry are not equal, one of the motor driver circuits supplies current to the DC motor to drive it in a proper direction to correct the shutter opening. When the shutter has a correct opening, no signals are applied to the motor driver circuits and hence no driving current is supplied to the motor.

Each shutter can be controlled manually, if desired, by adjusting a potentiometer to provide an output voltage proportional to a desired image field dimension. Thus, the potentiometers when adjusted operate effectively as a manual override and also as an adjustment of the system. In addition, if the X-ray tube is spaced from the film by other than predetermined distances, or if the tube is not oriented in particular directions, the system can operate only in a manual mode. Thus, the automatic control is enabled only under predetermined conditions and otherwise disabled.

It is again noted that two servo channels are provided, so that the length and width of the shutter opening can be individually controlled. Each channel comprises circuitry for providing a voltage proportional to the proper shutter opening in one dimension, digital comparison circuitry, two motor driver circuits, and a reversible DC motor, as previously described.

DESCRIPTION OF A PREFERRED EMBODIMENT

Figure 1:
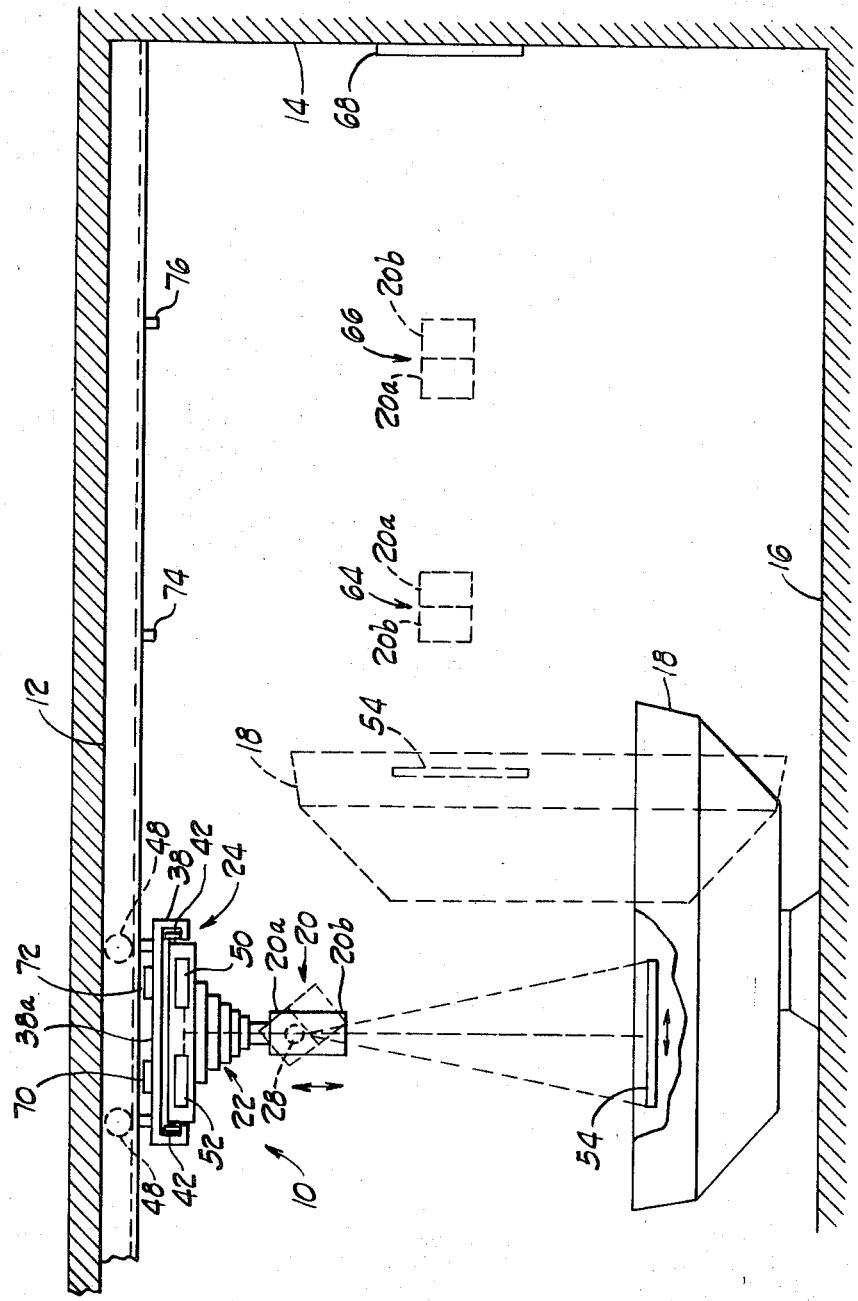
FIG. 1 is a diagrammatic elevational view of an X-ray installation embodying the invention.
Figure 2:
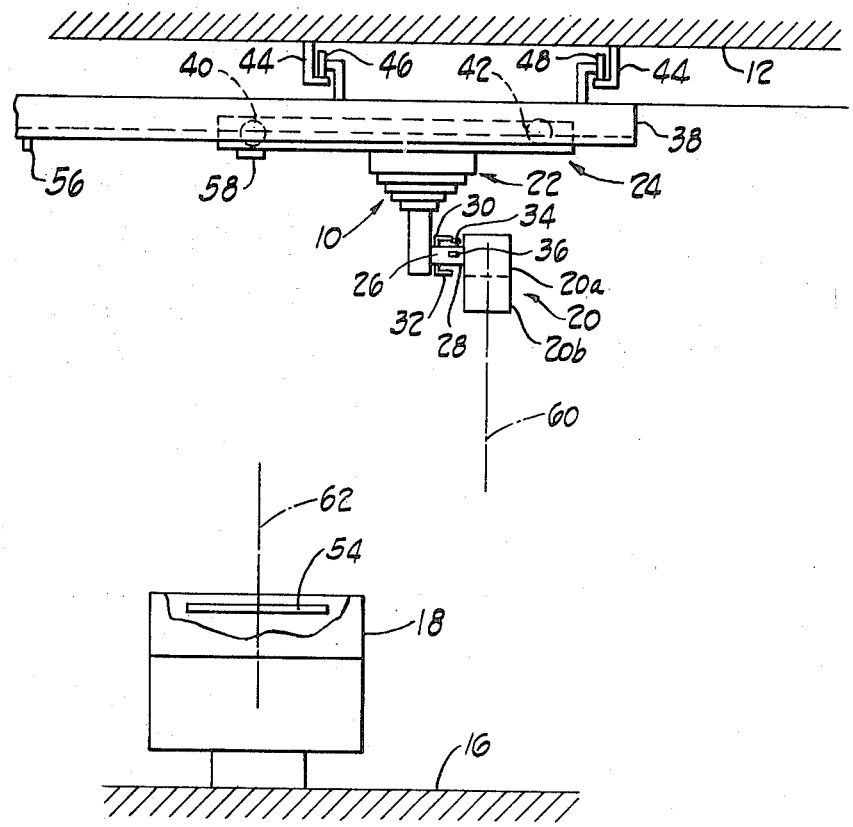
FIG. 2 is an end view of the installation shown in FIG. 1.

FIGS. 1 and 2 show the physical arrangement of an X-ray apparatus 10 embodying the invention installed in a typical X-ray examination room having a ceiling 12, an end wall 14, and a floor 16. An X-ray table 18 is secured to the floor 16. The table 18 is preferably one of the usual and well-known types of tiltable tables that is tiltable about a horizontal axis from the position shown in full lines to the upright position shown in broken lines.

The X-ray apparatus 10 comprises a housing 20, which is divided into two sections 20a, 20b, a tubular telescopic column 22 and an overhead tube carriage 24. The housing section 20a contains a conventional X-ray tube (not shown in FIG. 1), and the housing section 20b contains shutters (not shown in FIG. 1) which limit the dimensions of the beam projected downwardly toward the X-ray table 18 from the X-ray tube within the housing section 20a. The shutters define a shutter plane a fixed distance from the X-ray tube or source.

The telescopic column 22 may be of the type described in U.S. Pat. No. Re. 24,982, issued May 9, 1961 to R. C. Schiring for "Tubular Telescopic Column." Inasmuch as its construction is described in detail in that patent, it will not again be repeated here.

The housing 20 carrying the X-ray tube and the shutter mechanism is supported at the lower end of the telescopic column 22 by means of a bracket comprising two hollow tubular members 26, 28 (FIG. 2). The member 26 is secured to the lower end of the column 22 and the member 28 is secured to the housing 20. The members 26, 28 are connected by an axle (not shown), about which the member 28 and the housing 20 are rotatable. Three possible positions of the housing 20 as it is rotated about the horizontal axis of the members 26, 28 are shown in broken lines in FIG. 1.

A pair of microswitch actuators 30, 32 are mounted diametrically opposite each other on the fixed member 26, and a pair of microswitches 34, 36 are mounted on the rotatably member 28 and are displaced from each other by 90°. The actuators 30, 32 and microswitches 34, 36 are so mounted relative to each other that the microswitch 34 is actuated by the actuator 30 when the housing 20 is vertically disposed and the X-ray beam is directed straight downwardly. If the housing 20 is rotated 90° in one direction, the microswitch 36 is actuated by the actuator 30, and if it is rotated 90° in the other direction, the microswitch 36 is actuated by the actuator 32. The reason for the microswitches 34, 36 will be explained in detail in connection with FIGS. 6 and 7.

The overhead tube carriage 24 from which the telescopic column 22 is suspended is portably mounted on channel members 38 by means of rollers 40, 42. The channels 38 are in turn portably mounted on track members 44 by means of rollers 46, 48. Thus, it is seen that the channels 38 and tracks 44 provide a carriage upon which the telescopic column can be moved in two different directions in a horizontal plane. The telescopic column 22 provides for movement of the housing 20 in a vertical direction, and the members 26, 28 and their enclosed axle provide for rotation of the housing 20 about a horizontal axis.

For purposes of raising and lowering the telescopic column 22, a mechanism, shown generally by a block 50, is provided. The mechanism 50 may take the form of a motor, such as is shown in the referenced patent of Schiring et al., which is mechanically connected by means of a cable or the like (not shown) to the lower end of the tubular column 22. Alternatively, the mechanism 50 may comprise a counterweight mechanism, such as springs and a variable sheave as shown in U.S. Pat. No. 2,968,732 issued Jan. 17, 1961 to A. J. Foderaro, entitled "Tube Stand Head Counterbalance," to enable the column to be easily raised and lowered by hand. The mechanism 50 is also mechanically connected to a movable arm of a variable resistor 52, whereby movement of the arm is directly related to raising and lowering of the X-ray source housing 20. The mechanism 50 also controls a limit switch 53 (not shown in FIG. 1) that opens when the column extension lies outside of predetermined limits, such as less than 36 inches or more than 48 inches.

Figure 3:
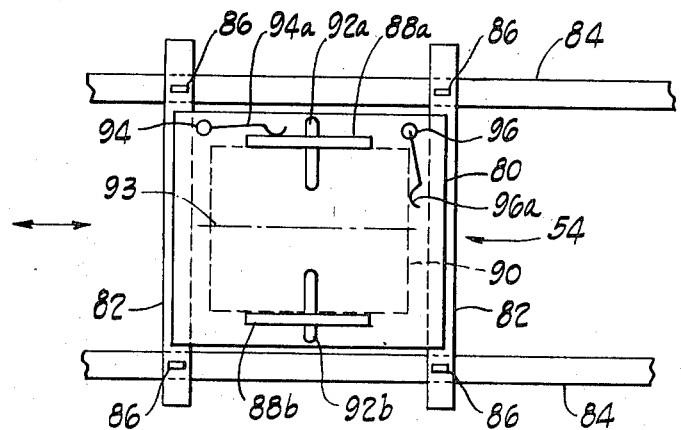
FIG. 3 is a diagrammatic plan view of a film holder embodied in the X-ray table shown in FIG. 1.

The X-ray table 18 contains a mechanism for supporting an X-ray sensitive image producing medium in the form of the usual cassette tray, shown diagrammatically at 54 in FIGS. 1 and 2 and in more detail in FIG. 3. The cassette tray 54 is adapted for movement longitudinally of the X-ray table 18, but not for movement transversely, other than, as is conventional for loading or unloading. Because the cassette tray is not movable transversely of the table, it is desirable that the automatic shutter control of the invention be operable only when the X-ray source is centered over the cassette tray in a transverse direction with respect to the longitudinal axis of the X-ray table 18. To this end, a centering switch 56 is mounted on one of the channels 38 and is actuated by an actuator 58 mounted on the overhead tube stand 24. The centering switch 56 will be closed by the actuator 58 only when a centerline 60 of the X-ray source housing 20 is in alignment (left and right as seen in FIG. 2) with a centerline 62 of the cassette tray 54.

One position suggested by the previous description is when the X-ray apparatus is directly over the X-ray table 18 and the centerline of the X-ray beam is vertical relative to the film cassette 54. Other positions for operation are also illustrated in FIG. 1. As has been indicated, the housing 20 may be rotated either to the right or to the left by as much as 90°. When rotated in a clockwise direction (as seen in FIG. 1 and the carriage 24 is appropriately moved), the housing 20 may assume a position shown generally at 64 in FIG. 1. If rotated counter-clockwise (and the carriage is further moved), the housing may assume a position shown generally at 66 in FIG. 1. In the position shown at 64, the housing 20 has been rotated by 90° and is adapted to expose an X-ray film placed in the cassette tray 54 when the table 18 is in the upright position illustrated in broken lines. When the housing has been rotated 90° in the opposite direction, as shown at 66 in FIG. 1, it is adapted to expose an X-ray sensitive film placed in a cassette holder 68 mounted on the end wall 14 of the examination room. The latter arrangement is particularly useful when taking radiographs of a subject standing upright, as, for example, in taking X-rays.

In both of the orientations of the X-ray source housing 20 shown at 64 and 66, the focal point of the X-ray source contained in the housing 20a must be at predetermined fixed distances from the plane of the film contained in either the cassette holder 54 or the wall-mounted cassette holder 68 in order for the shutter to adjust automatically. In the case of the orientation shown at 64, the focal point of the X-ray source must be at the mentioned predetermined fixed distance, for example 40 inches from the plane of the film contained in the holder 54, or the shutter will not automatically adjust for film size. In the case of the orientation shown at 66, the focal point of the X-ray source a predetermined fixed distance, a typical distance being 72 inches, from the plane of the film contained in the holder 68. In each case, the shutter will automatically adjust for one predetermined film size. To those ends, various microswitches and actuators are provided in association with the movable portions of the X-ray supporting structure.

More specifically, the channels 38 are linked by a crossmember 38a, which has mounted thereon two microswitches 70, 72. Two actuators 74, 76 are respectively mounted on the two track members 44. The actuator 74 is so located that when the focal point of the X-ray source is spaced from the plane of the film in the cassette holder 54 (when the table 18 is in upright position) by 40 inches, the microswitch 70 is actuated. Similarly, the actuator 76 is so located that when the focal point of the X-ray source is spaced 72 inches from the plane of the film in the cassette holder 68, it actuates the microswitch 72. As in the case of the microswitches previously discussed, the function of the microswitches 70, 72 will be described in detail in connection with FIGS. 6 and 7.

The limit switch 53 previously mentioned (shown in FIGS. 6 and 7) permits automatic adjustment for various film sizes only when the X-ray source focal point is within a predetermined range of distances from the plane of the film, say 36–48 inches. This will be explained further in connection with FIGS. 6 and 7.

When the housing 20 is in the position shown in solid lines in FIG. 1, that is, oriented vertically with respect to the X-ray table 18, the shutter control system of the invention is sensitive and responsive to the distance between the focal point of the X-ray source in the housing 20 and the plane of the film in the cassette container 54, to the size of the film in the cassette, and to the centering of the X-ray source with respect to the cassette in a transverse dimension across the table 18. When the source housing is in the position shown at 64 in FIG. 1, the control system is responsive to the fixed predetermined distance between the source and the film cassette, to the size of the film in the cassette 54, and to the centering of the source with respect to the centerline of the film. When the source housing is in the position shown at 66 in FIG. 1, the control is responsive to the fixed predetermined distance between the X-ray source and the plane of the film in the cassette holder 68, but is operable with only one predetermined size of film in the cassette holder 68 and is not sensitive to centering of the source with respect to the cassette. That predetermined size may be varied, but it requires a manual adjustment rather than the system being automatically responsive to different sizes of film.

The cassette holder 54 is shown in diagrammatic plan view in FIG. 3. So far as its mechanical aspect is concerned, the cassette tray 54 is conventional in design and is well known in the art. It comprises a support plate 80 mounted on crossmembers 82. The crossmembers 82 are movably mounted on channel members 84 by means of rollers 86. The channels 84 are, of course, mounted in the X-ray table 18. Thus, it is seen that the cassette holder 54 is movable longitudinally of the X-ray table on the rollers 86, but is not movable transversely of the table, as was previously pointed out.

The cassette tray 54 is provided with a pair of centering members 88a, 88b between which a cassette 90 (shown diagrammatically in broken lines) may be placed. The centering members 88a, 88b are respectively supported on posts (not shown) that extend through slots 92a, 92b in the support plate 80. The posts that support the centering members 88a, 88b are mechanically interconnected and spring-biased toward each other, so that a cassette 90 placed between the centering members is always centered on a centerline 93 of the cassette tray 54. Index marks are generally placed on the cassette 90 and on the centering members 88 to facilitate centering of the cassette longitudinally of the X-ray table.

Mounted on the support plate 80 are two potentiometers 94, 96. The potentiometer 94 has a lever 94a secured to its movable pickoff arm; the lever 94a is spring-biased to move in a clockwise direction and bears against the outer or rear surface of the centering member 88a. The potentiometer 96 also has a lever 96a secured to its movable pickoff arm with the lever 96a also being spring-biased to move in a clockwise direction. The levers 94a, 96a are formed with arcuate portions that respectively engage the centering member 88a and the cassette 90. Thus the potentiometers 94, 96 may be of a linear type and their outputs will be linear. In other words, if the cassette size is changed by 25 percent in each dimension, the outputs of the potentiometers will change between their limits by 25 percent rather than as a trigonometric function of cassette dimension change.

When a cassette 90 is placed in the cassette tray, and is properly centered therein, the position of the movable arm 94a of the potentiometer 94 will be indicative of one dimension of the cassette. Similarly, the position of the movable arm 96a of the potentiometer 96 will be indicative of the other dimension of the cassette. Of course, the cassette used must be of the proper size for the film it carries. In other words, the size of the cassette is approximately proportional to the size of the film to be exposed.

Figure 4:
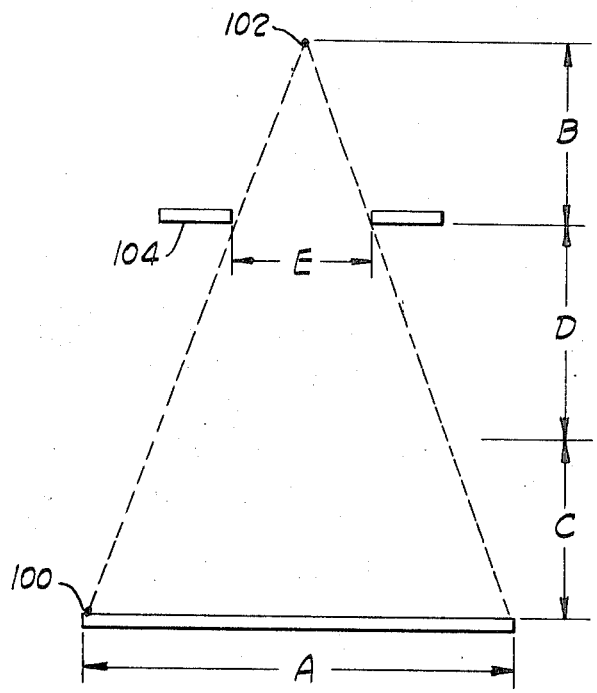
FIG. 4 is a diagram illustrating the geometric considerations involved in the invention.

FIG. 4 illustrates the geometry necessary to an understanding of the invention. Although only a two-dimensional diagram is shown, it is understood that a third dimension is involved. In other words, only one dimension of the two dimensions (length and width) that define the shutter opening size and image field size are shown. A similar diagram could be drawn using height as one dimension and the other shutter opening and field dimension as its other dimensions. As shown, A represents a desired image field dimension (a variable) in an image plane 100. B represents distance from a point source 102 (X-ray tube) to a shutter plane 104 (a constant). C represents a minimum allowable distance between the image plane 100 and the shutter plane 104 (a constant). D represents distance between the planes 100, 104 minus the distance C (a variable) and E represents one dimension of the shutter opening (a variable).

The following proportionality equations can be written for the diagram of FIG. 4:

$$E/A = B/(B+C+D) \quad (1)$$

or $$E = AB/(B+C+D) \quad (2)$$

Figure 5:
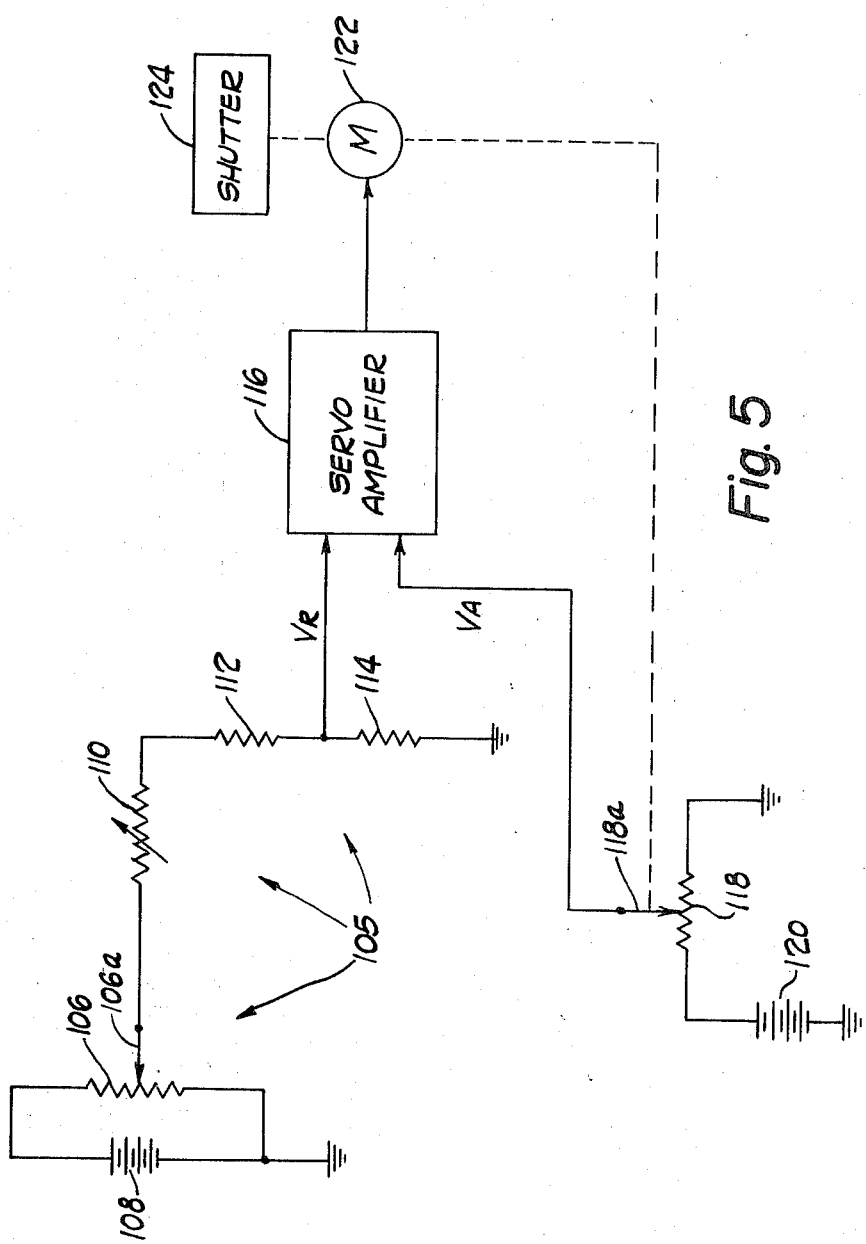
FIG. 5 is a simplified schematic and block diagram of a servo channel particularly showing means for developing a reference voltage that is a function of an image field dimension and distance between the image plane and an X-ray tube and means for developing a voltage that is proportional to actual shutter opening.

It is noted that equation (2) has the same form as the well-known electrical equation $I=V/R$, where $I$ is current flowing through a resistance $R$, and $V$ is voltage applied across the resistance $R$. It follows then that equation (2) can be set up using electrical parameters rather than spacial parameters. FIG. 5 shows a simple analog circuit or computer 105 that may be used for solving that equation.

As shown, a potentiometer 106 having a movable arm 106a is connected across a source of direct current, shown as a battery 108. The negative side of the battery 108 is grounded. The position of the movable arm 106a of the potentiometer determines the voltage applied to the remainder of the circuit, and it is set to obtain a voltage that corresponds to the term $A$ in equation (2). The terms in the denominator of equation (2) are represented by series-connected resistors 110, 112, 114 connected between the potentiometer arm 106a and ground. The resistor 110 is variable, and resistors 112, 114 are of fixed value. The variable resistor 110 represents the variable distance $D$ in equation (2) and the resistors 112, 114, respectively represent the constant distances B and C in that equation. The current that flows through the resistors 110, 112, 114 is a function to their resistance values and the potential applied across them from the arm 106a of the potentiometer 106. That current is a measure of the desired shutter opening $E$ in equation (2). A potential $V_R$ representing that shutter opening is taken from across the resistor 114, and is proportional to the current flowing through the resistors.

The signal $V_A$ is compared in a servoamplifier 116 with a signal $V_A$ indicating the actual shutter opening size. The signal $V_A$ is obtained from a movable arm 118a of a potentiometer 118 connected across a source of direct current, such as a battery 120, the negative side of which is grounded. The end of the potentiometer that is not connected to the battery 120 is also grounded. The movable arm 118a of potentiometer 118 is mechanically connected to be moved by a reversible motor 122.

The servoamplifier 116 compares the input signals $V_R$ and $V_A$ and provides an output signal $V_E$ to drive the reversible motor 122 in a proper direction to make $V_A$ equal to $V_R$. The polarity of the signal $V_E$ controls the direction in which the motor 122 rotates which, in turn, controls the setting of the movable arm 118a of the potentiometer 118. The polarity of the output signal $V_E$ depends on which of the input signals $V_R$ or $V_A$ is larger.

As previously mentioned, the motor 122 is mechanically connected to the potentiometer movable arm 118a. It is also mechanically connected to a shutter 124 contained in the section 206 of the housing 20 (FIGS. 1 and 2). Therefore, the position of the movable arm 118a accurately reflects the opening (in one dimension) of the shutter.

Figure 6:
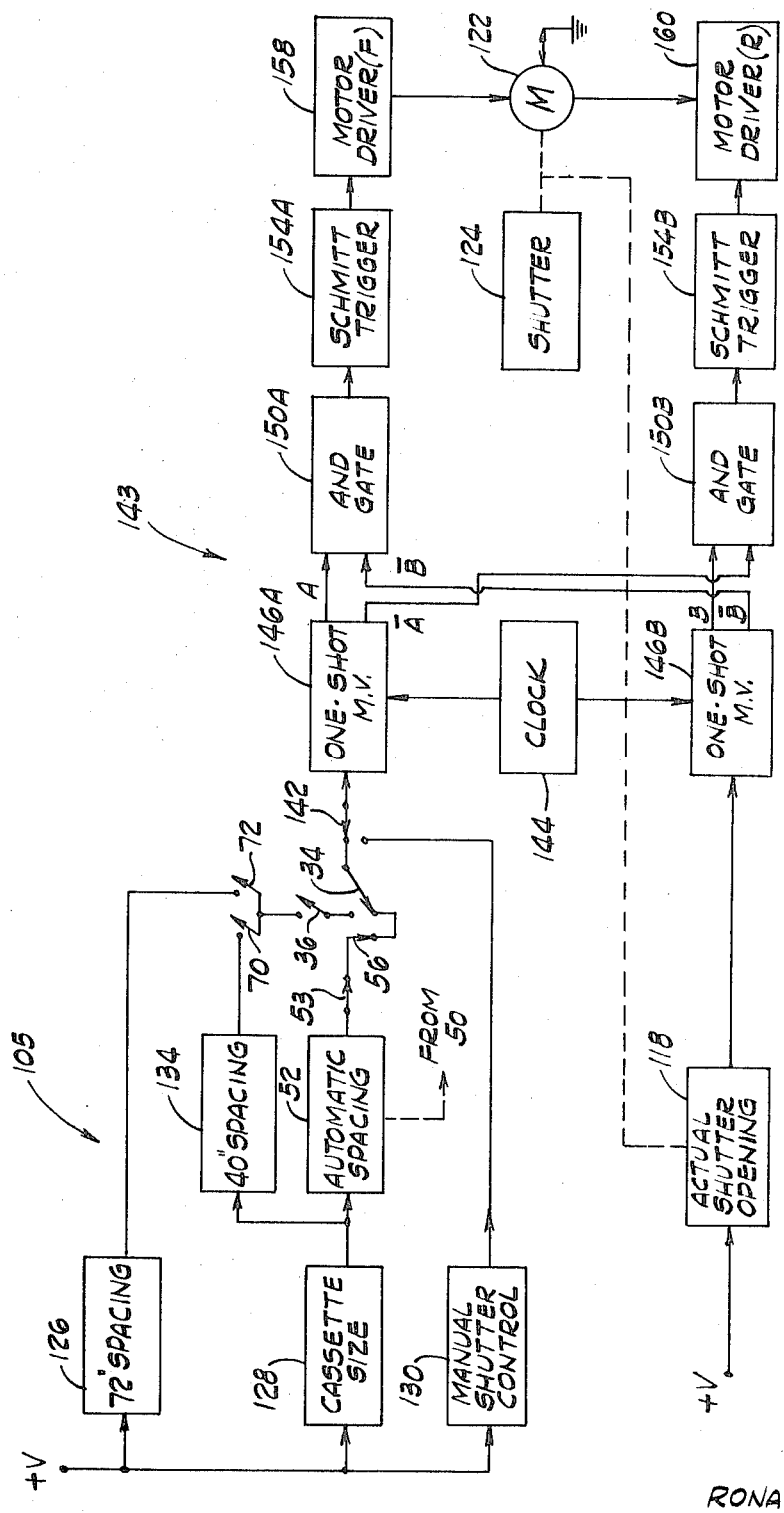
FIG. 6 is a block diagram illustrating one servo channel of a two channel control embodying the invention.

It will be appreciated that the analog circuit shown in FIG. 5 is a very simplified one, and is used only for purposes of illustrating the basic principle on which the invention is based. A block diagram of an actual circuit is shown in FIG. 6. It is understood that the block diagram of FIG. 6 represents circuitry for controlling the shutter opening in one dimension only, and two such arrangements would be utilized in practice. It does, however, illustrate in block form the interconnections of the various sections that are responsive to cassette size, spacing of the X-ray source from the cassette, orientation of the housing about its horizontal axis, whether the shutter control is automatic or must be manual, etc.

Referring to FIG. 6, it is seen that in the analog computer 105 +V is supplied from a source (not shown) to three devices 126, 128, 130 that respectively represent 72 inch spacing between the X-ray tube focal spot and the film in the cassette, cassette size (in one dimension), and manual shutter opening control. The devices preferably take the form of potentiometers from whose movable arms voltages proportional to various image sizes may be taken. The device 126 is manually adjusted to the proper setting for the 72-inch tube-to-film spacing; the device 128 is either the potentiometer 90 or the potentiometer 96 that reflect cassette size (both of which are shown in FIG. 3); and the device 130 is manually adjustable for various desired image sizes.

The output of the 72-inch spacing device 126 is provided to one contact of the microswitch 72 (FIG. 1). The output of the cassette size device 128 is supplied to a 40-inch spacing device 134 (such as a variable resistor) and to the automatic spacing variable resistor 52, the latter being shown in FIG. 1 as driven by the column height adjusting motor 50. The output of the 40-inch spacing device 134 is connected to one contact of the microswitch 70 (FIG. 1), and the output of the automatic spacing potentiometer is connected by the limit switch 53 to one contact of the microswitch 56 (FIG. 2).

The second contacts of the microswitches 70, 72 are connected together and to one contact of the microswitch 36 (FIG. 2), and the other contact of the microswitch 36 is connected to one contact of the microswitch 34. The second contact of the microswitch 56 is connected to a second contact of the microswitch 34. The microswitch 34 is a two-contact, single-pole switch, whose pole is connected to one contact of a two-contact, single-pole switch 142, which serves as a manually-automatic shutter control switch. The second contact of the switch 142 is connected to the output of the manual shutter opening control 130.

A potentiometer (not shown) may also be connected between the output of the device 128 and ground through a manually operable switch (not shown). The movable arm of that potentiometer is connected to the input of the automatic spacing resistor 52, and is manually operable to reduce the image size below the maximum permissive size for the cassette being used.

The physical locations of the various microswitches shown electrically in FIG. 6 are shown in FIGS. 1 and 2. Their functions have also been described to some extent, but will become clearer if they are reviewed in connection with FIG. 6.

It is clearly apparent that a signal is provided on the pole of the manual-automatic switch 142 directly from the manual shutter opening control 130, when the pole of the switch 142 is in its lower position. However, when the switch 142 is in its upper position (as shown), the purposes of the various microswitches are more difficult to understand. First, consider the switch 34. It can be in the position shown only when the X-ray tube housing 20 is oriented vertically downward, as shown in FIG. 2. Even then, a signal can be supplied through the switch 34 from the automatic spacing variable resistor 52 through the switch 56 only when the housing 20 is centered transversely over the cassette in the table 18. If the housing 20 is not properly centered, a signal can be provided to the switch 34 only from the switch 36. The switch 36 is not actuated unless the housing 20 is oriented horizontally, as shown at 64 and 66 in FIG. 1. If the housing is spaced 40 inches from the cassette, the swirl 70 will be actuated, and if the spacing is 72 inches the switch 72 will be actuated. Thus, it is seen that automatic operation of the shutter opening can be obtained only if the housing is vertically oriented and is transversely centered over the X-ray table, or if the housing is horizontally oriented and is spaced 40 or 72 inches from the cassette. Otherwise, control must be exercised from the manual shutter opening control 130.

The invention also includes digital comparison circuitry 143, in which a clock pulse generator 144 provides pulses to two one-shot multivibrators or flip-flops 146A, 146B, which serve as digital-to-analog converters. The flip-flop 146A also receives the signal passed by the manual-automatic switch 142, and the flip-flop 146B receives the signal proportional to actual shutter opening from the actual shutter opening potentiometer 118. Of course, the potentiometer 118 is connected to the source +V direct current. The amplitudes of the signals provided to the flip-flops 146A, 146B from the switch 142 and the potentiometer 118, respectively, control the widths of the output pulses produced by the flip-flops. Both flip-flops provide complementary output signals, the flip-flop 146A providing signals A, $\overline{A}$, and the flip-flop 146B providing signals B, $\overline{B}$.

The signals A, B̄ are provided as two inputs of AND-gate 150A, and the signals B, Ā are similarly provided to an AND-gate 150B. The operation of the flip-flops 146A, 146B and the AND-gates 150A, 150B will be better understood from the following description of FIGS. 7 and 8. Suffice it to say at this point that if the signal provided from the switch 142 is of greater amplitude than the signal provided from the potentiometer 118, and AND-gate 150A will produce an output signal to trigger a Schmitt trigger circuit 154A. If the opposite is true, an output signal from the AND-gate 150A will trigger another Schmitt circuit 154B.

If the Schmitt circuit 154A is triggered, it energizes a forward motor driver circuit 158, which in turn drives current through the motor 122 to cause it to rotate in a forward direction and increase the shutter opening. Conversely, if the Schmitt circuit 154B is triggered, it energizes a reverse motor driver circuit 160 to decrease the shutter opening. As the motor 122 adjusts the shutter 124, it also varies the output signal from the actual shutter opening potentiometer 118. This action continues until neither Schmitt circuit 154A, 154B is triggered, at which time the actual shutter opening size will match the desired shutter opening size.

One form of actual circuitry embodying the invention will be described with reference to FIG. 7 and its operation will then be described with reference to FIGS. 7 and 8. Wherever possible, the same reference numerals have been applied to components that are shown in FIGS. 6 and 7, even though they are shown in block form in FIG. 6 and schematically in FIG. 7.

Figure 7:
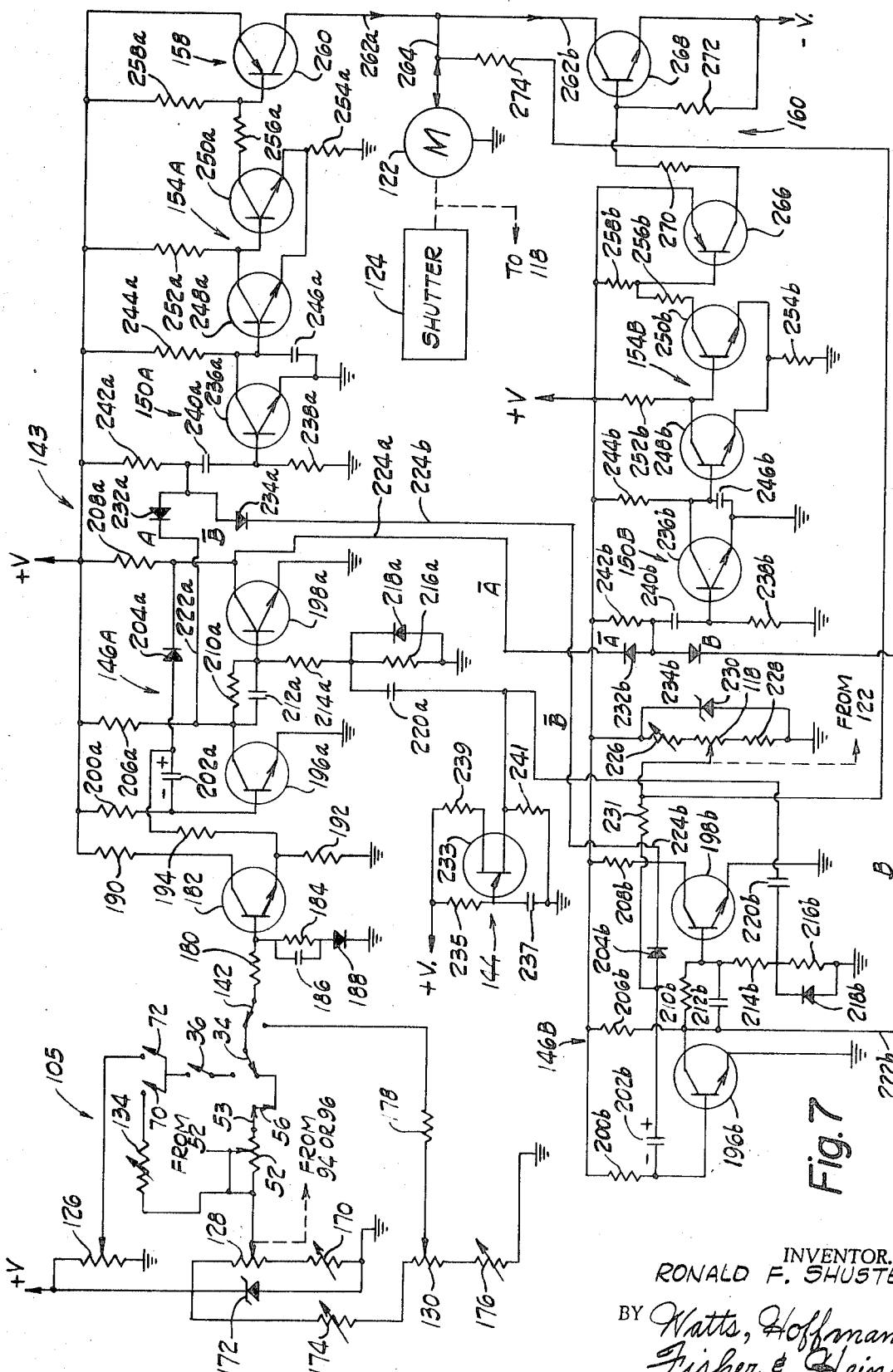
FIG. 7 is a schematic diagram of the servo channel shown in block form in FIG. 6.

As shown in FIG. 7, direct voltages +V and −V are supplied to energize the circuitry from a source (not shown). In the analog computer 105, one end of the 72-inch spacing potentiometer 126 is connected to +V and the other end is grounded. The movable arm of the potentiometer 126 is connected to one contact of the microswitch 72. One end of the cassette size potentiometer 128 is also connected to +V, and its other end is grounded through a variable resistor 170. A Zener diode 172 is connected across the potentiometer 128 and the resistor 170 to maintain the voltage drop thereacross constant. For physical reasons, the shutter does not close completely and the variable resistor 170 is adjusted to compensate for that minimum shutter opening. Also connected across the diode 172 is a series combination of a variable resistor 174, the manual shutter control opening potentiometer 130, and another variable resistor 176. The resistors 174, 176 respectively determine the maximum and minimum shutter openings obtainable under manual control.

The movable arm of the cassette size potentiometer 128 is connected to one end of the automatic spacing variable resistor 52 and to one end of the 40-inch spacing variable resistor 134. The other end of the variable resistor 52 is connected through the limit switch 53 and the centering microswitch 56 to one contact of the switch 34 that is responsive to the angular orientation of the X-ray tube housing 20. The other end of the variable resistor 134 is connected to one contact of the microswitch 70. As previously noted, second contacts of the microswitches 70, 72 are connected together and through the microswitch 36 to the second contact of the microswitch 34. Also as previously noted, the pole of the microswitch 34 is connected to one contact of the manual-automatic switch 142. The second contact of the switch 142 is connected through a fixed resistor 178 to the movable arm of the manual shutter opening control potentiometer 130.

The pole of manual-automatic switch 142 is connected through a resistor 180 to the base of an NPN-transistor 182 arranged as an emitter-follower. The base of the transistor 182 is also connected to one end of a parallel combination of a resistor 184 and a capacitor 186 whose other end is grounded through a diode 188. The purpose of the diode 188 is to compensate for the small base-to-emitter voltage drop in the transistor 182. Of course, the signal from the switch 142 appears primarily across the resistor 184. The collector of the transistor 182 is connected to +V through a resistor 190, and its emitter is grounded through a resistor 192. The emitter of the transistor 182 is also connected into the one-shot flip-flop 146A through a resistor 194.

The flip-flop 146A comprises a pair of NPN-transistors 196a, 198a, both of whose emitters are grounded. The base of the transistor 196a is supplied with a +V through a resistor 200a, and is also connected to the collector of the transistor 198a through a capacitor 202a and a diode 204a connected in series. The collector of the transistor 196a is connected in series. The collector of the transistor 196a is connected to +V through a load resistor 206a, and the collector of the transistor 198a is similarly connected through a load resistor 208a. The base of the transistor 196a is connected to the collector of the transistor 198a through a resistor 210a and a capacitor 212a connected in parallel. The base of the transistor 198a is also connected to ground through series-connected resistors 214a, 216a, and a diode 218a is connected across the resistor 216a with its anode grounded. The juncture of the resistors 214a, 216a is connected through a capacitor 220a to receive positive-going clock pulses from the clock pulse generator 144. Output signals are provided from the collector of the transistor 196a on a lead 222a and from the collector of the transistor 198a on a lead 224a. These signals are, of course, complementary and are respectively designated A and Ā.

In operation, the transistor 196a is normally conducting, and the transistor 198a is nonconducting. Thus, the signal A is low (virtually at ground potential), and the signal Ā is high (virtually at +V potential). The capacitor 202a charges with the polarity shown, that is, it is positive on the side connected to the anode of the diode 204a. When a positive-going clock pulse is received on the base of the transistor 198a, that transistor becomes conductive and the capacitor 202a discharges through it. The length of time that it takes the capacitor 202a to discharge, and hence the width of the output signal from the flip-flop, depends on the charge built up across the capacitor. That charge is dependent on the voltage provided through the switch 142 and the emitter-follower transistor 182 from the analog computer 105. Thus, the width of the output pulse from the flip-flop is proportional to a desired or computer shutter opening.

The one-shot flip-flop 146B is constructed identically with the flip-flop 146A just described. The same reference numerals refer to identical components, those in the flip-flop 146A being followed by the suffix "a" and those in the flip-flop 146B being followed by the suffix "b." The only difference is that the flip-flop 146B receives its direct current input signal from the actual shutter opening potentiometer 118.

The potentiometer 118 is connected in series with and between a variable resistor 226 and a fixed resistor 228 between +V and ground, and a Zener diode 230 is connected across the series combination of the resistor 226, the potentiometer 118 and the resistor 228 to maintain a fixed voltage drop thereacross. The movable arm of the potentiometer 118 is connected to the juncture of the capacitor 202b and the diode 204b through a resistor 231. As previously noted, the movable arm of the potentiometer 118 is mechanically connected to be driven by the shutter drive motor 122 along with the shutter 124. Therefore, the potential on the movable arm of the potentiometer 118 accurately reflects the size of the shutter opening at all times. That potential is utilized to charge the capacitor 202b in the flip-flop 146B. Thus, the width of the output pulse from the flip-flop 146B is proportional to the actual shutter opening.

The clock pulse generator 144 that supplies pulses to trigger the one-shot flip-flops 146A, 146B is a conventional relaxation oscillator comprising a P-type unijunction transistor 233. The emitter of the transistor 233 is connected to +V through a resistor 235 and to ground through a capacitor 237. One base electrode is connected to +V through a resistor 239. The other base electrode is grounded through a resistor 241. The output is taken from the base electrode that is connected to the resistor 241 and supplied to the capacitors 220a, 220b as noted before. The circuit constants of the clock pulse generator are preferably so chosen that it oscillates at a frequency other than 60 cycles per second or a harmonic thereof, so that the system is insensitive to line voltage frequency variations.

The A output pulses from the flip-flop 146A appearing on the lead 222a are supplied to the cathode of a diode 232a in the AND-gate 150A, and $\overline{B}$ output pulses from the flip-flop 146B appearing on the lead 224b are supplied to the cathode of another diode 234a in the same AND gate. The anodes of the diodes 232a, 232b are connected together. The gate 150A includes an NPN-transistor 236a, whose base is grounded through a resistor 238a. The base of the transistor 236a is also connected to one side of a capacitor 240a, the other side of which is connected to +V through a resistor 242a. The anodes of the diodes 232a, 234a are connected to the juncture of the capacitor 240a and the resistor 238a, which serve to differentiate incoming pulses. The collector of the transistor 236a is connected to +V through a resistor 244a, and the emitter of that transistor is grounded. A capacitor 246a connects the collector and emitter of the transistor 236a. The output signal from the AND-gate 150A is taken from the collector of the transistor 236a.

The transistor 236a in the gate 150A is normally nonconductive, because its base and emitter are at essentially the same potential. Thus the potential at its collector is high. When positive A and $\overline{B}$ pulses overlap, the leading edge of the overlap is differentiated to drive the base of the transistor 236a positive and produce a negative-going pulse at the collector of that transistor. The pulse overlap must occur for approximately two microseconds (in a practical embodiment) to produce the negative-going output pulse. This represents the "dead band" of the system.

The AND-gate 150B operates in exactly the same manner as the AND-gate 150A, and the same reference numerals are again used but with a "b" suffix. The only difference is that the diodes 232b, 234b are respectively provided with $\overline{A}$ and B pulse signals instead of A and $\overline{B}$ signals as in the case of the gate 150A.

The Schmitt trigger circuit 154A is conventional in design, and comprises two NPN-transistors 248a, 250a. The base of the transistor 248a is connected to the collector of the transistor 236a in the AND-gate 150A. The collector of the transistor 248a and the base of the transistor 250a are connected together and to +V through a resistor 252a. The emitters of the transistors 248a, 250a are connected together to ground through a resistor 254a. The collector of the transistor 250a is connected to +V through two fixed resistors 256a, 258a connected in series.

The transistor 248a is normally conducting and the transistor 250a is nonconducting. When a negative-going trigger pulse is received from the AND-gate 150A, the state of the transistors 248a, 250a reverse, and the potential on the collector of the transistor 250a goes from high to low. So long as pulses continue to be received at intervals less than the charging time constant for the capacitor 246a (at the input of the circuit 154A), the transistor 250a will continue to conduct and its collector potential will remain low.

The forward motor driver circuit 158 comprises a PNP-transistor 260, whose base is connected to the juncture of the resistors 256a, 258a. The emitter of the transistor 260 is connected directly to +V, and its collector is connected through a lead 262a and a lead 264 to the motor 122 that drives the shutter 124. When the transistor 205a is nonconducting in the absence of trigger pulses, the base and emitter of the forward drive transistor 260 are at essentially the same potential and the transistor 260 is not conducting. Therefore, no current flows in the lead 262. When the transistor 250a conducts, the potential on the base of the transistor 260 goes low and the transistor 260 conducts. Current thus flows downwardly (as seen in FIG. 7) through the lead 262a and through the lead 264 and the motor 122 to ground to cause the motor to rotate in a forward direction.

The reverse motor driver circuit 160 is similar to the forward motor driver circuit 158, except that it also includes a PNP-inverting transistor 266 and an NPN-transistor 268 instead of the PNP-transistor 260. The base of the transistor 266 (inverter) is connected to the juncture of the resistors 256b, 258b, its emitter is connected directly to +V, and its collector is connected through a resistor 270 to the base of the transistor 268. The base of the transistor 268 is also connected to −V through a resistor 272. The collector of the transistor 268 is connected to the motor 122 through a lead 262b and the lead 264, and the emitter is connected directly to −V. When the transistor 250b is nonconducting in the absence of trigger pulses, the base and emitter of the transistor 266 will be at the same potential and that transistor will be nonconductive. Thus, the base and emitter of the driver transistor 268 will be at the same potential and that transistor will also be nonconductive. Thus, current will not flow from the drive motor 122 to −V. When the transistor 250b conducts, the base of the transistor 266 goes low and that transistor conducts. This raises the base potential of the transistor 268 and it conducts to draw current from ground through the shutter drive motor 122 and the leads 264 and 262b to −V. This causes the motor 122 to rotate in a direction opposite to that in which it rotates when the transistor 260 conducts.

It is pointed out that the shutter drive motor 122 rotates at full speed or it does not rotate at all. This occurs because the system is digital in nature, and the driver transistors 260, 268 are either fully conductive or completely nonconductive. Thus, the motor 122 draws no current when the system is in a balanced condition, and no "hunting" takes place.

Any signal appearing on the lead 264 is fed back through a resistor 274 to the juncture of the resistor 231 and the movable arm of the actual shutter opening potentiometer 118. This counter e.m.f. prevents the motor from being overdriven and the null counteracted when it is reached.

Figure 8A:
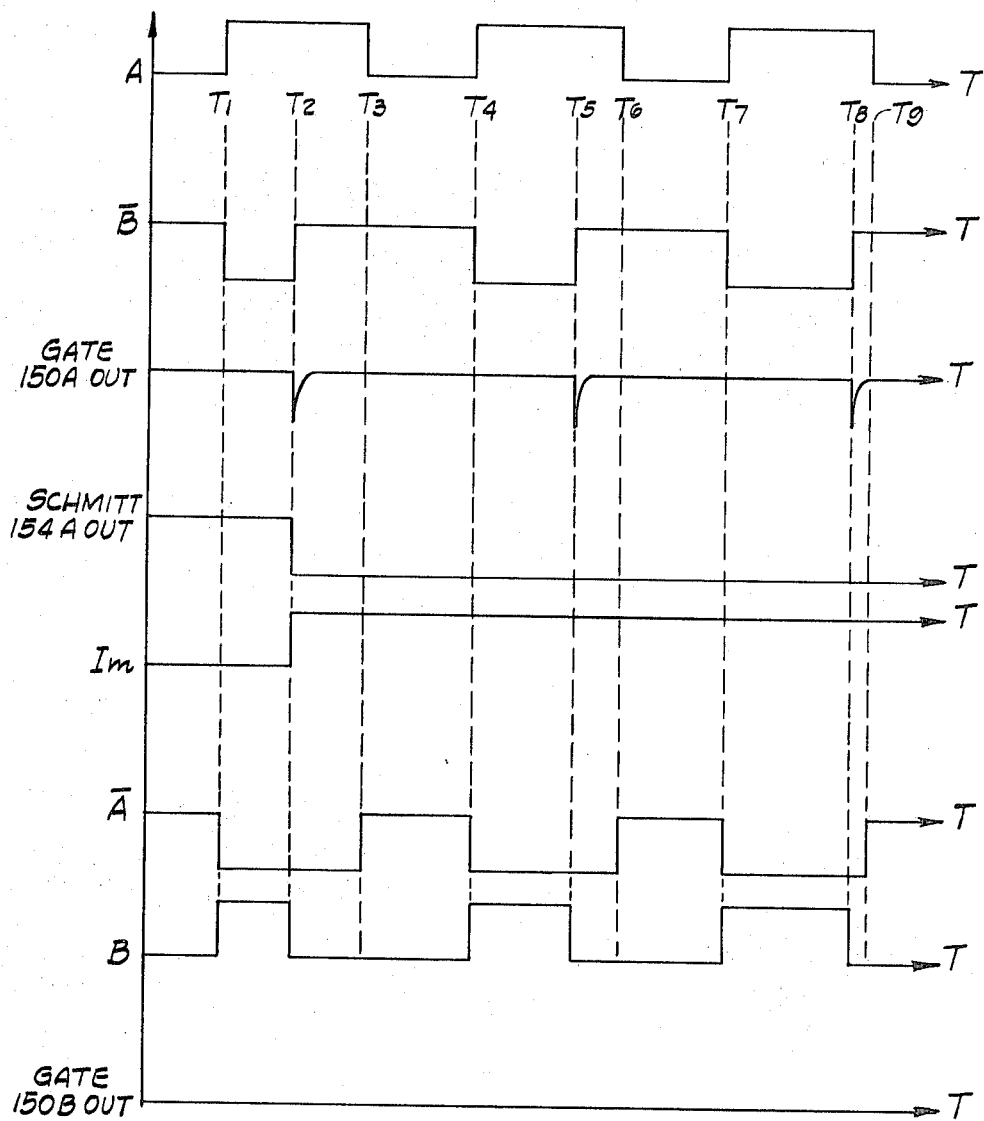
FIGS. 8A and 8B are idealized waveforms and timing diagrams useful in understanding the operation of the circuitry shown in FIG. 7.

FIG. 8A illustrates in idealized form various waveforms throughout the circuitry when the actual shutter opening is less than the desired or computed shutter opening. In that situation, the signal A is relatively long and fixed in duration, and occurs from times $T_1$–$T_2$, $T_4$–$T_6$ and $T_7$–$T_9$. The $\overline{B}$ signal is considerably shorter and of increasing duration and occurs from $T_1$–$T_2$, $T_4$–$T_5$ and $T_7$–$T_8$, thus indicating that the actual shutter opening is smaller than desired. The B and $\overline{B}$ signals are provided from the flip-flops 146A, 146B to the AND-gate 150A. As previously noted, there can be an output signal from the gate 150A only when both A and $\overline{B}$ are high. This occurs between times $T_2$–$T_3$, $T_5$–$T_6$ and $T_8$–$T_9$. Thus, at times $T_2$, $T_5$, $T_8$ negative-going spike pulses are provided from the AND-gate 150A to the Schmitt circuit 154A to trigger it. When the circuit 154A is triggered, it causes the forward motor driver circuit 158 to become conductive and energize the motor 122 to increase the actual shutter opening. As the shutter opening increases, the time periods when both A and $\overline{B}$ are high decreases, as is shown at $T_5$–$T_6$ and $T_8$–$T_9$. However, the Schmitt trigger circuit 154 A stays on because the period between trigger pulses from the AND-gate 150A is less than that required for the Schmitt circuit to turn off because of the capacitor 246a and the time it takes that capacitor to charge by a sufficient amount to turn on the transistor 248A and reverse the state of the trigger circuit. When the time of high coincidence of And and $\overline{B}$ has decreased to about 2 microseconds, the Schmitt circuit turns off and the motor 122 stops. Under the foregoing conditions, there is no time when both $\overline{A}$ and B are simultaneously high. Therefore, there will be no output pulses from the AND-gate 150B, the Schmitt circuit 154B will not turn on, and there will be no current through the motor driver transistor 268 (as shown in the lower portion of FIG. 8A).

Figure 8B:
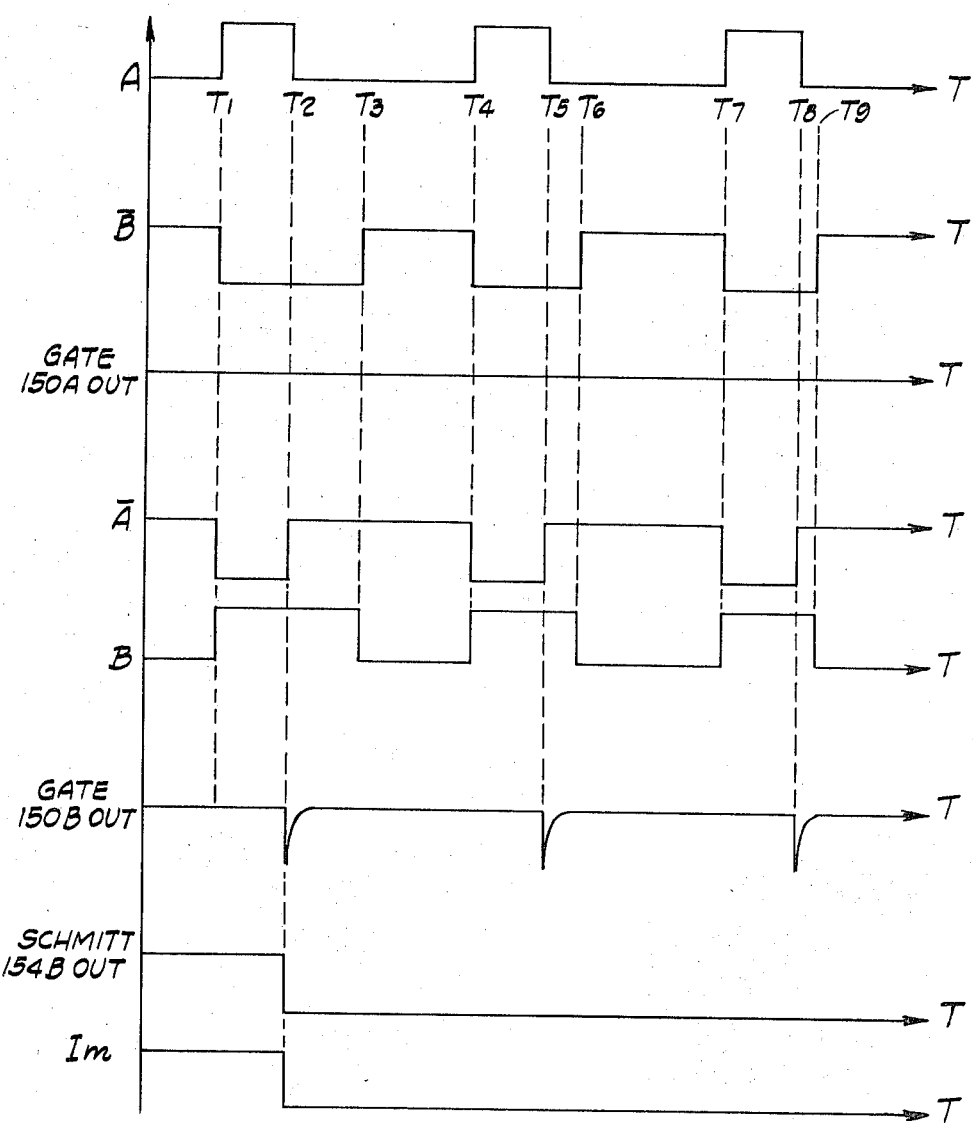

If the opposite situation exists and the shutter opening is greater than the desired or computer shutter opening, the waveforms are as shown in FIG. 8B. In that case, it is seen that A and $\overline{B}$ are never simultaneously high. Therefore, there is output signal from the AND-gate 150A, the Schmitt trigger 154A is not turned on, and there is no current through the forward motor drive transistor 260. On the other hand, $\overline{A}$ and B become simultaneously high at times $T_2T_5$, $T_8$. At those times, the AND gate 150B produces output pulses that trigger on the Schmitt trigger circuit 154B, which causes the reverse driver transistor 268 to become conductive and remain conductive until cessation of the output signal from the Schmitt circuit 154B. The explanation of the continuous "on" operation of the Schmitt circuit made with reference to the circuit 154A is applicable to the circuit 154B.

If there is no simultaneous high condition existing between A, $\overline{B}$ or between $\overline{A}$, B for more than approximately 2 microseconds, neither Schmitt circuit 154A, 154B is turned on, neither driver transistor 260, 268 conducts, and the shutter drive motor 122 is completely deenergized.

It is now apparent that the invention meets the general objective set forth. In addition, a system embodying the invention is insensitive to line voltage frequency variations or, because of the use of Zener diodes in critical analog areas, to power supply variations. It has a very small dead band, and minimum settling time without hunting. Because the system is digital in nature as opposed to analog, the shutter drive motor draws no current when the system is balanced. The motor is either "on" or "off," and it rotates in either direction at only one speed.

I claim:

1. In X-ray apparatus having a source of X-rays for forming an image of predetermined image field size in an image plane, said image plane being variable in distance from said source, a shutter system comprising:
   a. shutter means defining a variable size shutter opening therein, said shutter means being interposed between said source and said image plane whereby some of said X-rays pass through said shutter opening in a shutter-defined beam;
   b. power means for varying the size of said shutter opening and hence the size of said shutter-defined beam;
   c. first electrical means for providing a first analogue signal whose value is proportional to desired shutter opening size to provide said predetermined image field size;
   d. first converter means for providing a first digital signal whose value is proportional to the value of said first analogue signal;
   e. second electrical means for providing a second analogue signal whose value is proportional to actual shutter opening size;
   f. second converter means for providing a second digital signal whose value is proportional to the value of said second analogue signal amplitude;
   g. comparison means for comparing said values of said first and second digital signals; and,
   h. driver means for energizing said power means for varying the size of said shutter opening to vary said actual shutter opening size until a predetermined ratio is obtained between said first and second digital signals.

2. The system of claim 1, wherein said first electrical means comprises analog computer means responsive to distance between said source and said image plane.

3. The system of claim 1, wherein said power means for varying the size of said shutter opening comprises reversible motor means.

4. The system of claim 3, wherein said driver means comprises two driver circuits for respectively energizing said reversible motor means to cause said motor means to rotate in opposite directions.

5. The system of claim 1, wherein said first electrical means includes selector means for selectively providing said first analogue signal from a plurality of signals whose amplitudes are correspondingly proportional to the plurality of different image field sizes.

6. The system of claim 5, wherein said plurality of signals represent respectively first and second fixed predetermined distances between said source and said image plane, and a third variable distance between said source and image plane other than said predetermined distances.

7. The system of claim 6, further including limiting means for limiting said signals representing said second and third distances to correspond to maximum image field sizes permissible for said second and third distances.

8. The system of claim 5, wherein said limiting means comprises means responsive to size of a film located in said image plane.

9. The system of claim 6, wherein said selector means includes a plurality of switches for automatic actuation at various distances between said source and said image plane.

10. An X-ray apparatus comprising:
   a. a support structure for supporting an X-ray sensitive image producing medium in an image plane;
   b. an X-ray tube and collimator assembly including tube support structure movably supporting an X-ray tube for movement independent of the support structure along a path including a vector paralleling the image plane;
   c. automatic collimator control means for controlling the position of X-ray beam delineating diaphragms of said collimator according to the tube to image plane spacing for producing a given X-ray image in the plane; and,
   d. disabling means for disabling said collimator control means unless the X-ray tube is spaced from the image plane a predetermined distance and enabling said collimator control means when the tube is a predetermined distance from said plane.

11. The apparatus of claim 10 wherein said tube support structure is a ceiling mounted X-ray tube supporting carriage and wherein the disabling means includes mechanism responsive to the horizontal position of the carriage.

12. The apparatus of claim 11 wherein the mechanism responsive to the horizontal position of the carriage senses a carriage position transversely central of an X-ray table below the carriage and forms a part of the disabling means which enables said collimator control means when the tube is positioned in an appropriately determined position relative to the table.

13. The apparatus of claim 11 wherein said mechanism responsive to the horizontal movement of the carriage enables said collimator control means when the exposure plane is vertical and the X-ray tube is oriented toward the vertical film plane and a predetermined distance from it.

14. The apparatus of claim 10 wherein said predetermined distance is any distance between maximum and minimum predetermined distances from said image plane.

15. The apparatus of claim 10 wherein said predetermined distance is a single fixed distance.

16. The apparatus of claim 10 wherein the collimator control means also controls the diaphragm according to the size of said medium.

17. The apparatus of claim 16 wherein a medium size sensing means is connected to the support structure for sensing the size of the medium and adjusting the collimator according to said sensed size.

18. The apparatus of claim 17 wherein the medium is a sheet of radiographic film and wherein said size is sensed by sensing the size of a film cassette when the cassette is positioned to place a sheet of radiographic film in said image plane.

19. The collimator of claim 10 wherein a manual collimator control means is provided for adjusting said diaphragms when the automatic collimator control means is disabled.

20. The apparatus of claim 19 wherein there is an override for said automatic collimator control means to permit manual adjustment of the diaphragms, of said collimator when the automatic collimator control means would otherwise be enabled.

21. In an X-ray apparatus including an X-ray tube supported by a ceiling mounted carriage movable horizontally along the ceiling, an X-ray table including a film tray below the surface of the table for support of radiographic film in a film plane, a collimator including adjustable diaphragms connected to the X-ray tube and interposed between the tube and the film plane when a sheet of film is in the tray to be exposed, the combination of:

a. collimator control means for automatically adjusting the opening of said diaphragms according to the size of the radiograph to be produced and the distance between said X-ray tube and said film plane; and, b. enabling means enabling said control means whenever said tube and collimator are oriented toward the film plane and the tube is spaced from the film plane a predetermined distance.

22. The apparatus of claim 21 wherein said predetermined distance is any distance between maximum and minimum predetermined distances from said image plane.

23. The apparatus of claim 21 wherein said predetermined distance is a single fixed distance.

24. An X-ray apparatus comprising:

a. a support structure for supporting an X-ray sensitive image producing medium in an image plane;

b. an X-ray tube and collimator assembly including tube support structure movably supporting an X-ray tube for movement independent of the support structure along a path including a vector paralleling the image plane;

c. automatic collimator control means for controlling the position of X-ray beam delineating diaphragms of said collimator according to the tube to image plane spacing for producing a given X-ray image in the plane;

d. first electrical means for providing a first analogue signal whose value is proportional to desired positions of said diaphragms to provide a predetermined image field size;

e. first converter means for providing a first digital signal whose value is proportional to the value of said first analogue signal;

f. second electrical means for providing a second analogue signal whose value is proportional to an actual diaphragm opening size;

g. second converter means for providing a second digital signal whose value is proportional to the value of said second analogue signal amplitude;

h. comparison means for comparing said values of said first and second digital signals; and, i. driver means for energizing said collimator control means for varying the positions of said diaphragms to vary said actual positions of said diaphragms until a predetermined ratio is obtained between said first and second digital signals.

25. An X-ray apparatus comprising:

a. a support structure for supporting an X-ray sensitive image producing medium in an image plane;

b. an X-ray tube and collimator assembly including tube support structure movably supporting an X-ray tube for movement independent of the support structure along a path including a vector paralleling the image plane;

c. automatic collimator control means for controlling the position of X-ray beam delineating diaphragms of said collimator according to the tube to image plane spacing for producing a given X-ray image in the plane;

d. first electrical means for providing a first analogue signal whose value is proportional to desired positions of said diaphragms to provide a predetermined image field size;

e. first converter means for providing a first digital signal whose value is proportional to the value of said first analogue signal;

f. second electrical means for providing a second analogue signal whose value is proportional to an actual diaphragm opening size;

g. second converter means for providing a second digital signal whose value is proportional to the value of said second analogue signal amplitude;

h. comparison means for comparing said values of said first and second digital signals;

i. driver means for energizing said collimator control means for varying the positions of said diaphragms to vary said actual positions of said diaphragms until a predetermined ratio is obtained between said first and second digital signals; and i. disabling means for disabling said collimator control means unless the X-ray tube is spaced from the image plane a predetermined distance and enabling said collimator control means when the tube is a predetermined distance from said plane.

26. The apparatus of claim 25 wherein said medium support structure is a ceiling mounted X-ray tube supporting carriage and wherein the disabling means includes mechanism responsive to the horizontal position of the carriage.

27. The apparatus of claim 26 wherein the mechanism responsive to the horizontal position of the carriage senses a carriage position transversely central of an X-ray table below the carriage and forms a part of the disabling means which enable said collimator control means when the tube is positioned in an appropriately determined position relative to the table.

28. The apparatus of claim 26 wherein said mechanism responsive to the horizontal movement of the carriage enables said collimator control means when the exposure plane is vertical and the X-ray tube is oriented toward the vertical film plane and a predetermined distance from it.

29. The apparatus of claim 25 wherein said predetermined distance is any distance between maximum and minimum predetermined distances from said image plane.

30. The apparatus of claim 25 wherein said predetermined distance is a single fixed distance.

31. The apparatus of claim 25 wherein the collimator control means also controls the diaphragm according to the size of said medium.

32. The apparatus of claim 31 wherein a medium size sensing means is connected to the support structure for sensing the size of the medium and adjusting the collimator according to said sensed size.

33. The apparatus of claim 32 wherein the medium is a sheet of radiographic film and wherein said size is sensed by sensing the size of a film cassette when the cassette is positioned to place a sheet of radiographic film in said image plane.

34. The collimator of claim 25 wherein a manual collimator control means is provided for adjusting said diaphragms when the automatic collimator control means is disabled.

35. The apparatus of claim 34 wherein there is an override for said automatic collimator control means to permit manual adjustment of the diaphragms of said collimator when the automatic collimator control means would otherwise be enabled.

* * * * *

UNITED STATES PATENT OFFICE
CERTIFICATE OF CORRECTION

Patent No. 3,643,095          Dated February 15, 1972

Inventor(s) Ronald F. Shuster

It is certified that error appears in the above-identified patent and that said Letters Patent are hereby corrected as shown below:

Column 8, line 53, change "swirl" to ---switch---.

Column 9, line 8, after "118" change "and" to ---the---.

Column 12, line 41, change "$T_1 - T_2$" to ---$T_1 - T_3$---;

line 63, change "And" to ---A---.

Signed and sealed this 8th day of August 1972.

(SEAL)
Attest:

EDWARD M. FLETCHER, JR.           ROBERT GOTTSCHALK
Attesting Officer                 Commissioner of Patents